Jan. 26, 1932. L. R. SMITH 1,842,462

ATTACHMENT FOR NOZZLES

Filed April 2, 1929

Witness
Edwin L. Bradford

Inventor
Louis R. Smith
By Wm. O. Dyre
His Attorney

Patented Jan. 26, 1932

1,842,462

UNITED STATES PATENT OFFICE

LOUIS R. SMITH, OF HAWTHORNE, NEVADA

ATTACHMENT FOR NOZZLES

Application filed April 2, 1929. Serial No. 351,910.

My invention relates to nozzles, and more particularly to a new and useful attachment for the nozzles of hoses used at gasoline filling stations for effecting delivery of gasoline from the pump to the fuel tanks of motor vehicles.

It is well known that great precautions are now commonly taken in the handling of gasoline from the refinery to the vehicle filling station to prevent contamination of the fuel by the introduction of water and solid impurities. Prior to my present invention, however, the benefits of these precautionary measures have often been entirely undone in the final step in the handling of automobile motor fuel, that is, in the act of transferring the gasoline from the filling station pump to the fuel tank of a vehicle. The great majority of these pumps are exposed to street and road dust, and many are also exposed to the weather, so that when gasoline is delivered, while it is raining, to a vehicle from such an exposed pump not provided with my present invention, it is impossible to prevent the introduction into the tank along with the gasoline of a certain amount of rain water.

Another disadvantages of the plain nozzles now in common use is the difficulty of retaining them securely in the vehicle fuel tank mouth, which is regularly of much larger diameter than the nozzle. Under the impulse of the stream of gasoline passing more or less rapidly through the hose, these plain nozzles frequently have to be manually held in place in the tank mouth. When not so held they have been known to jump from the mouth with a consequent loss of gasoline and fouling of the nozzle by contact with the ground.

It is an object of my present invention to provide means associated with a gasoline pump delivery hose nozzle which will effectively seal the tank mouth and the parts of the nozzle contacting therewith against ingress of dust, rain water, or other foreign matter.

A further object is to provide means for rendering a nozzle positively but detachably engageable with such vehicle fuel tank mouths as are provided with a standard cap-engaging thread, as well as with those not provided with a standard thread, and of any diameter, within certain limits.

Other and further objects and advantages of the invention herein described and claimed will sufficiently appear as the description proceeds.

In the drawings forming part of this application for Letters Patent, in which like reference characters refer to the same parts in the several views, Figure 1 is a vertical section through the top wall of an automobile fuel tank and a nozzle inserted therein provided with my invention;

Figure 1:
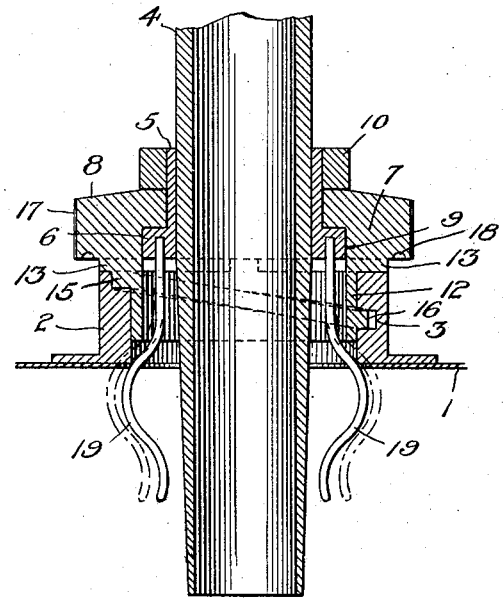
Figure 2:
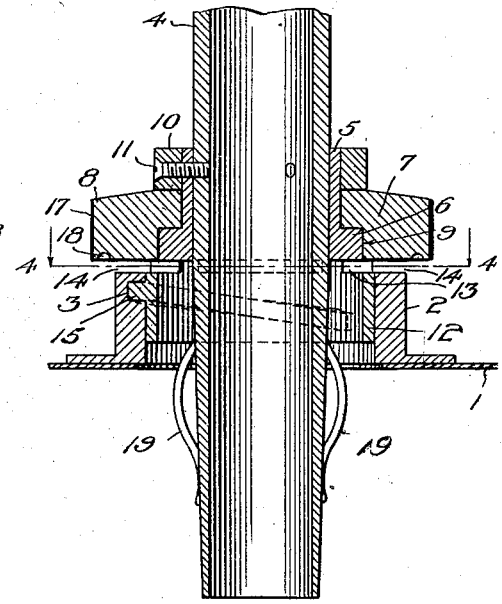
Fig. 2 is a vertical section similar to that shown in Fig. 1 but taken at an angle of 45° thereto.
Figure 3:
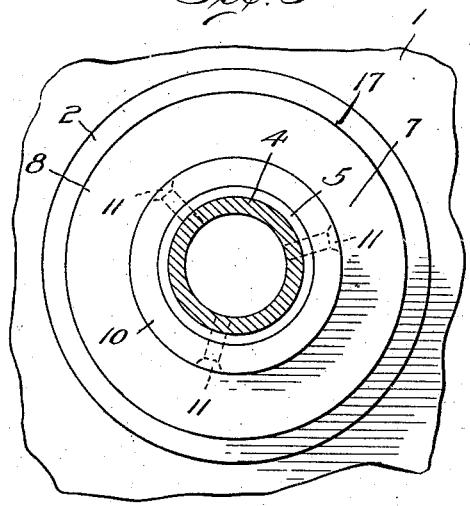
Fig. 3 is a top plan view.
Figure 4:
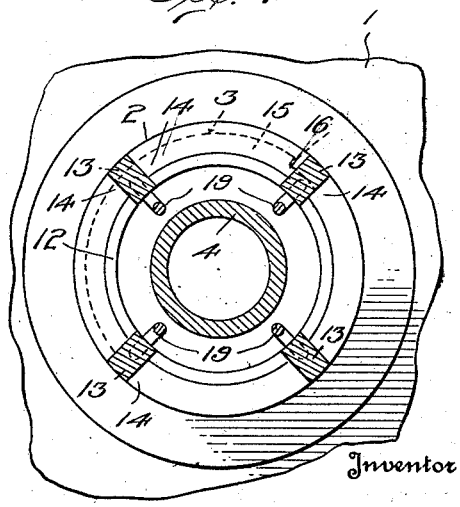
Fig. 4 is a horizontal section taken along the line 4—4 of Fig. 2.

Referring to the drawings, 1 indicates an automobile fuel tank of any well known construction or dimensions, with a customary cylindrical mouth 2 mounted thereon and communicating with the interior of the tank through a suitable aperture in the top wall thereof. The mouth 2 which I have shown on the accompanying drawings is similar to that described in my United States Patent No. 1,788,473, issued January 13, 1931, for improvements in locking mechanism for vehicle fuel tanks. This mouth 2 is therefore provided with a standard 180° internal thread 3 for engaging the cap normally in place on the mouth, but not shown in the accompanying drawings.

It is to be understood, however, that the invention which I shall now proceed to describe and claim herein is by no means limited to use in connection with this or any other specific type of tank mouth, but may be used with equal facility and effectiveness on internally or externally threaded mouths of any diameters, within, of course, certain limits determined by the size of the specific structure in which the invention may be embodied.

An ordinary hoxe nozzle, designated by the numeral 4, is provided at a convenient point, say some 6 or 8 inches from its discharge end, with a snugly fitting sleeve 5, secured to the nozzle in fluid-tight relation, which has at its lower end, that is, the end nearest the outlet of the nozzle, a peripheral flange 6. A shield member 7, comprising an upper portion 8 of a diameter greater than that of any tank mouth with which it may be proposed to use the device, and having a central circular opening of a diameter slightly larger than that of the sleeve 5, is slipped over this sleeve. The circular opening in the shield member is radially enlarged at 9 to seat the portion 8 against the flange 6. A collar 10 fits snugly over the upper portion of the sleeve 5, and set screws 11 pass through registering holes in collar, sleeve and nozzle to secure these three elements together and lock the shield against axial movement on the sleeve, but permit it to rotate thereon.

The shield member 7 is provided with a lower cylindrical portion 12 of reduced diameter, and these two parts are connected and spaced apart by a series of lugs 13, which project radially beyond the outer wall of the reduced portion 12, but not as far as the periphery of the disc portion 8. I have shown four of these lugs each integral with the shield 7 and reduced portion 12, but it will be obvious that they need not be integral if the shield and reduced portion are not parts of a single casting, and furthermore they need not be four in number. Their function is merely to provide bent apertures 14 between the shield 7 and the reduced cylindrical portion 12, for a purpose which will be hereinafter explained.

The reduced lower portion 12 is provided with a coarse 180° external thread 15, which is adapted to engage with the internal thread 3 of the standard tank mouth shown in the accompanying drawings. The lower end of the thread 15 is cut away, as shown at 16, to prevent the end of the thread from actuating the sliding notched bar of tank mouths constructed according to the teaching of my patent above identified.

The vertical edge 17 of the upper portion 8 may be conveniently milled to facilitate rotation of the same about the sleeve 5. It is apparent from the foregoing explanation that a nozzle provided with my present invention may be inserted in a tank mouth provided with a standard thread 3, and that thereupon rotation of the shield member 7 will bring the nozzle into positive but readily detachable engagement with the tank mouth, since the bottom faces of the connecting lugs 13 will be screwed home against the upper surface of the mouth 2.

It will be further apparent that this engagement will be such that rain water or the like will be prevented from entering the tank since the entire area of the mouth opening is covered by the inserted nozzle and its associated parts. An annular groove 18 underneath the overhanging part of the disc portion 8 forms a convenient drip for the shedding of any water which may run down the vertical milled edge 17 of the shield.

The spaced apertures 14 are provided between the large upper and reduced lower portions of the shield member 7 to serve as a series of vents to permit of ready exit of air in the tank as it is displaced by entering gasoline. Besides preventing ingress of water into a tank when the same is being filled with gasoline, the device which I have described is also effective in preventing the introduction of outside air with its dust into the tank, since, when gasoline is passing through the nozzle, currents of displaced air will be moving outwardly from the tank through the apertures 14 and it will not be possible for outside air and dust to enter the tank through these vent apertures.

In order to adapt my present invention for use on tank mouths not provided with a standard thread 3 capable of meshing with the thread 13, depending spring catches 19 are inserted in the flange 6 of the sleeve 5. These springs, preferably four in number, are contracted inwardly at their lower ends and flare outwardly immediately thereabove, so that upon being inserted in a tank mouth these flaring portions will be radially compressed, and when the assembly is pushed home into the mouth of a tank these springs 19 will be urged outwardly against the inner face of the mouth to retain the nozzle positively in place therein.

It is to be understood that I have shown and described but one embodiment of my present invention. Modifications exemplifying the principle thereof will readily suggest themselves to persons familiar with the art, but all such modifications are to be considered within the scope and purview of the appended claims.

What I claim and desire to secure by Letters Patent is:

1. An attachment for nozzles adapted to be used in filling receptacles comprising a sleeve secured in fluid tight relation to the nozzle and having a peripheral flange, a member having an upper and a lower portion, the lower portion being adapted to extend into the receptacle mouth and having a screw thread for engagement therewith, and the upper portion having an outer edge adapted to overhang the outer periphery of the receptacle mouth and an inner edge rotatably mounted on the sleeve, in combination with a collar secured to the sleeve in fluid tight relation and overhanging the inner edge of the member.

2. An attachment for nozzles adapted to be used in filling receptacles comprising a member rotatably mounted on the nozzle having an outer edge adapted to overhang the outer periphery of a receptacle mouth, in combinattion with a collar secured in fluid tight relation to the nozzle and overhanging the inner edge of the member, the member being provided with a lower portion having a screw thread adapted to engage a complementary thread on the receptacle mouth and being provided with a vent opening between its upper and lower portions to allow exit of air from the receptacle during the filling operation.

3. An attachment for nozzles adapted to be used in filling receptacles comprising a member mounted on the nozzle provided with a relatively large upper portion adapted to overhang the outer periphery of a receptacle mouth and a relatively small lower portion adapted to fit into a receptacle mouth, the member being provided with a vent opening in the upper part of the lower portion to allow exit of air from the receptacle during the filling operation, in combination with a collar secured in fluid tight relation to the nozzle and overhanging the inner edge of the member.

4. An attachment for nozzles adapted to be used in filling receptacles comprising a member rotatably mounted on the nozzle provided with a relatively large upper portion adapted to overhang the outer periphery of a receptacle mouth and a relatively small lower portion adapted to fit into a receptacle mouth, a series of lugs forming a shoulder adapted to abut against the top of a receptacle mouth being provided at the junction of the upper and lower portions, the spaces between adjacent lugs forming vent openings to allow exit of air from the receptacle during the filling operation, in combination with a collar secured in fluid tight relation to the nozzle and overhanging the inner edge of the member.

5. An attachment for nozzles as claimed in claim 4, in which a circular drip groove is provided in the under surface of the overhanging upper portion of the member outwardly of the series of lugs.

6. An attachment for nozzles adapted to be used in filling receptacles comprising a member rotatably mounted on the nozzle provided with an upper portion of relatively large area adapted to overhang the outer periphery of a receptacle mouth and a lower portion of relatively small area adapted to fit into a receptacle mouth, the member being provided with a circular series of vent openings immediately beneath the upper portion to allow exit of air from the receptacle during the filling operation, in combination with a collar secured in fluid tight relation to the nozzle and overhanging the inner edge of the member and a screw thread provided on the outer surface of the lower portion adapted to engage a complementary thread in the receptacle mouth.

7. An attachment for nozzles adapted to be used in filling receptacles comprising a member mounted on the nozzle provided with a relatively large upper portion adapted to overhang the outer periphery of a receptacle mouth and a relatively small lower portion adapted to fit into a receptacle mouth, the member being provided with vent opening in the upper part of the lower portion to allow exit of air from the receptacle during the filling operation.

8. An attachment for nozzles adapted to be used in filling receptacles comprising a member mounted on the nozzle provided with a relatively large upper portion adapted to overhang the outer periphery of a receptacle mouth and a relatively small lower portion adapted to fit into a receptacle mouth, a series of lugs forming a shoulder adapted to abut against the top of a receptacle mouth being provided at the junction of the upper and lower portions, the spaces between adjacent lugs forming vent openings to allow exit of air from the receptacle during the filling operation.

9. An attachment for nozzles for filling receptacles comprising a member mounted on the nozzle provided with a relatively wide upper portion the outer edge of which is adapted to overhang the outer periphery of a receptacle mouth and a relatively narrow lower portion adapted to fit into a receptacle mouth, the member being provided with a vent opening substantially at the juncture of the upper and lower portions to allow exit of air from the receptacle during the filling operation, the vent opening being protected from entrance of rain water and the like by the overhanging outer edge of the upper portion.

In testimony whereof I affix my signature.

LOUIS R. SMITH.